Dec. 3, 1929.          C. A. OLSON          1,738,480
                        LAWN MOWER
                     Filed Aug. 29, 1928
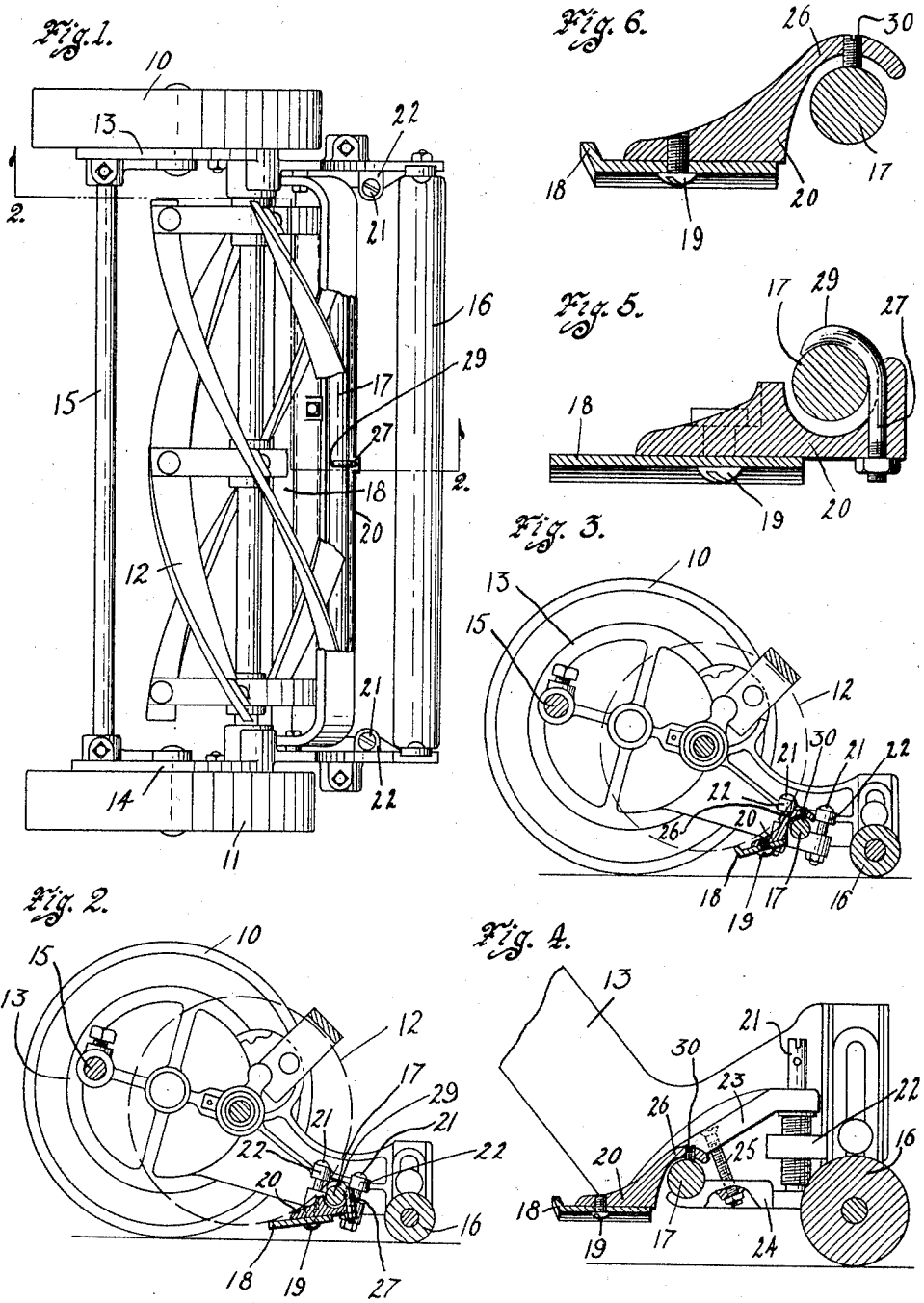
Witness
Vincent Brown
Inventor
Carl A. Olson
by Bair, Freeman & Sinclair
Attorneys Patented Dec. 3, 1929

1,738,480

UNITED STATES PATENT OFFICE

CARL A. OLSON, OF CLARINDA, IOWA, ASSIGNOR TO CLARINDA MANUFACTURING COMPANY, OF CLARINDA, IOWA, A CORPORATION OF IOWA

LAWN MOWER

Application filed August 29, 1928. Serial No. 302,694.

The object of this invention is to provide an improvement in lawn mowers which consists in means for compensating for wear at the central part of the stationary blade, so that the machine may be caused to continue to cut clean throughout the length of its cutting mechanism.

A further object of this invention is to provide a threaded adjusting member engaging the central portion of the member which carries the stationary blade of a lawn mower and arranged to draw the central portion of the blade closer to the rotary reel to compensate for excessive wear at that part of the blade.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a plan view showing a portion of a lawn mower including my improvement.

Figure 2 is a cross-section on the line 2—2 of Figure 1, showing one form of adjusting means.

Figure 3 is a view similar to Figure 2 and showing a different construction of mower having a correspondingly different form of adjusting means.

Figure 4 is a cross-sectional view showing a still different form of mower with an adjusting means similar to that shown in Figure 3.

Figure 5 is an enlarged detail section of the improvement according to the construction shown in Figure 2.

Figure 6 is a similar showing according to the construction of Figure 3 or Figure 4.

This invention relates to an improvement in that type of lawn mower in which a rotary cutter or reel is employed to coact with a relatively stationary blade for cutting grass. The stationary blade is usually mounted on a member called a bed bar, and adjusting screws are provided for tilting the bed bar to adjust the position of the edge of the blade relative to the orbit of the reel. The adjusting screws usually are located at the ends of the bed bar.

It has been found that in the use of a mower of this kind there is a greater wear at the central part of the stationary blade than at its ends. In other words, the wear is more or less in the form of a hollow curve longitudinally of the blade, so that the central part of the blade is not as close to the rotary cutter as the end portions, and hence the central part of the mower does not cut as well or as closely.

This defect, of course, cannot be overcome by manipulation of the usual adjusting screws, which tilt the bed bar bodily, or at either end selectively.

It is to overcome this difficulty that I have devised the present improvement, which consists of a threaded member for springing the central part of the bed bar more closely to the reel, enough to compensate for this extra wear at the center. This acts independently of the usual adjusting screws, or in addition to the adjustment secured by them.

In the drawing I have employed the numerals 10 and 11 to designate the wheels of a lawn mower, and the numeral 12 to designate a rotary cutter or reel mounted between and driven from said wheels.

The reel 12 is journaled in side frames 13 and 14, which are connected at their forward ends by a cross rod 15 and at their rear ends by a ground roller 16. There is also, in most mowers of this type, an additional cross member such as 17 just forwardly of the roller, which member is often in the form of a rod as here shown.

The stationary knife 18 is mounted, as by screws 19, on a bed bar 20 and is arranged with its cutting edge close to the orbit of the reel 12. The proper positioning of the bed bar and cutting edge of the blade 18 is accomplished by means of adjusting screws 21, usually mounted through ears 22 on the side frames and suitably engaging the bed bar for adjustably supporting it and the knife.

In the form of mower shown in Figures 2 and 3 there are two adjusting screws 21 at each side of the mower, and they pass through apertured portions of the bed bar at their lower ends.

In the form of mower shown in Figure 4 a single adjusting screw 21 is employed at each side of the mower, passing through an apertured arm 23 extending upwardly and rearwardly from each end of the bed bar. The lower ends of the screws 21 engage a clamping member 24 clamped to the cross member 17 and to the arms 23 by clamping bolts 25.

These different adjusting means form no part of my present invention, but are shown and described to illustrate the fact that my present improvement may be applied to mowers of different construction.

The bed bar is usually located close to a cross frame member such as the rod 17, and in most instances is hollowed out, grooved or in some manner formed so as to partially embrace said member.

In Figures 2 and 5 the bed bar 20 is located below the cross rod 17 and in Figures 3, 4 and 6, it is located forwardly of and partially overhanging the rod, the overhanging part being in the form of a thin lip or flange 26.

My improved adjusting and compensating means will have to assume different forms for the different constructions of mowers here shown, and possibly still different forms for still other constructions and arrangements of the bed bar or knife carrier relative to other parts of the mower.

In any event, my improvement is so designed as to apply pressure to the central part of the knife carrier to spring it and cause it to approach the orbit of the rotary knife or reel.

In the form shown in Figures 2 and 5 this means includes a hook bolt. The bolt 27 passes through a hole in the central part of the bed bar 20 and has a nut 28 threaded on its lower end. The upper end of the bolt is formed as a hook 20 which extends over and engages the cross rod 17.

By tightening the nut 28 on the bolt 27, the central part of the bed bar will be drawn up toward the cross member 17, and with it the central part of the blade 18 will be drawn up toward the reel.

As this is a springing action, the movement will be greater at the center where the bolt is located, and will taper toward both ends. This is in accordance with the way the wear seems to occur, so that by this means the coacting cutting means may be caused to cut clean thoughout their lengths.

In the form shown in Figures 3, 4 and 6, the compensating means is an adjusting screw 30 mounted in a tapped hole in the overhanging part 26 of the bed bar, and engaging at its end the cross member 17.

By thightening the screw 30 the central part of the bed bar is forced upwardly relatively to the cross member, thus forcing upwardly the central part of the blade 18, and accomplishing the same result as above set out.

In certain views of the drawing, I have shown, in exaggerated form, the result of the action of the screw device in springing the blade carrying member to cause the blade to be bulged upwardly in its central portion to compensate for wear, and in this connection attention is directed particularly to Figures 5 and 6.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a lawn mower having a blade mounted on a blade carrying member fixed at its ends, said lawn mower having a frame member extending adjacent said blade carrying member, an adjusting means comprising a member engaging said frame member and an intermediate portion of said blade carrying member for springing the latter to compensate for wear at the central part of the blade.

2. In a lawn mower having a blade mounted on a blade carrying member adjustably supported at its ends, said lawn mower also having a frame member extending adjacent said blade carrying member, an auxiliary adjusting means comprising a threaded member engaging said frame member and an intermediate portion of said blade carrying member for springing the latter to compensate for wear at the central part of the blade.

3. In a lawn mower having a blade fixed to a blade carrying member fixed at its ends, said lawn mower having a frame member arranged substantially parallel with said blade carrying member, a compensating means comprising a threaded member having a connection with said frame member and having a portion engaging the central part of said blade carrying member, whereby tightening of said compensating member will result in a springing of the blade carrying member and blade to compensate for excessive wear at the central part of the blade.

Des Moines, Iowa, August 8, 1928.

CARL A. OLSON.